US009785865B2

(12) United States Patent
Zhu et al.

(10) Patent No.: US 9,785,865 B2
(45) Date of Patent: *Oct. 10, 2017

(54) MULTI-STAGE IMAGE CLASSIFICATION

(71) Applicant: Microsoft Technology Licensing, LLC, Redmond, WA (US)

(72) Inventors: Lihua Zhu, Mountain View, CA (US); Sridhar Sankuratri, Sunnyvale, CA (US); Shir Aharon, Mountain View, CA (US); B. Anil Kumar, Saratoga, CA (US); Jeroen E. van Eesteren, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,671

(22) Filed: Apr. 10, 2017

(65) Prior Publication Data
US 2017/0213110 A1 Jul. 27, 2017

Related U.S. Application Data

(63) Continuation of application No. 14/664,662, filed on Mar. 20, 2015.

(51) Int. Cl.
*G06K 9/62* (2006.01)
*G06K 9/46* (2006.01)

(52) U.S. Cl.
CPC ......... *G06K 9/6268* (2013.01); *G06K 9/4642* (2013.01)

(58) Field of Classification Search
CPC .................. G06K 9/6268; G06K 9/4642

USPC ......................................... 382/224
See application file for complete search history.

(56) References Cited

U.S. PATENT DOCUMENTS

| 7,542,960 | B2 | 6/2009 | Basak et al. |
| 8,180,165 | B2 | 5/2012 | Lu et al. |
| 8,331,699 | B2 | 12/2012 | Dewan et al. |
| 8,588,518 | B2 | 11/2013 | Wang et al. |
| 8,600,143 | B1 | 12/2013 | Kulkarni et al. |

(Continued)

FOREIGN PATENT DOCUMENTS

| CN | 101853392 | 5/2012 |
| EP | 2756804 | 7/2014 |

OTHER PUBLICATIONS

Zhang, et al., "A Multi-Feature Optimization Approach to Object-Based Image Classification", In Proceedings of the 5th international conference on Image and Video Retrieval, Jul. 13, 2006, 10 pages.

(Continued)

*Primary Examiner* — Amandeep Saini
(74) *Attorney, Agent, or Firm* — Klarquist Sparkman, LLP

(57) ABSTRACT

Techniques are described for performing multi-stage image classification. For example, multi-stage image classification can comprise a first classification stage and a second classification stage. The first classification stage can determine an overall classification for an input image (e.g., based on a relative entropy result calculated for the input image). The second classification stage can be performed by dividing the image into a plurality of blocks and classifying individual blocks, or groups of blocks, based on a classification model that is specific to the overall classification of the image determined in the first classification stage.

20 Claims, 8 Drawing Sheets

(56) References Cited

U.S. PATENT DOCUMENTS

| | | | |
|---|---|---|---|
| 8,649,613 B1 | 2/2014 | Leung et al. | |
| 8,743,138 B2 | 6/2014 | Setou et al. | |
| 8,774,514 B2 | 7/2014 | Kim et al. | |
| 2007/0201751 A1* | 8/2007 | Wu | G06K 9/00456 382/232 |
| 2010/0290526 A1 | 11/2010 | Tong et al. | |
| 2011/0026840 A1 | 2/2011 | Tao et al. | |
| 2011/0274361 A1 | 11/2011 | Bovik et al. | |
| 2014/0172753 A1 | 6/2014 | Nowozin et al. | |
| 2014/0270495 A1 | 9/2014 | Tu et al. | |

OTHER PUBLICATIONS

Schafer, Sebastian, "A Computer-Assisted Motion Compensation and Analysis of Perfusion Ultrasound Data", In PhD thesis, Jan. 29, 2014, 149 pages.

Karavarsamis, et al., "Detecting pornographic images by localizing skin ROIs", In International Journal of Digital Crime and Forensics, Jan. 2013, 14 pages.

Malick et al., "Contour and Texture Analysis for Image Segmentation," International Journal of Computer Vision 43(1), pp. 7-27 (Jun. 2001).

Vezhnevets et al., "A Survey on Pixel-Based Skin Color Detection Techniques," Proceedings of GRAPHICON-2003, 8 pages (Sep. 2003).

Yun-Chia Liang and Josue R. Cuevas, "An Automatic Multilevel Image Thresholding Using RelativeEntropy and Meta-Heuristic Algorithms," Entropy 2013, 15(6), pp. 2181-2209 (Jun. 3, 2013).

Wikipedia, "Image texture," <http://en.wikipedia.org/wiki/Image_texture>, 4 pages (accessed Feb. 4, 2015).

Wikipedia, "Kullback-Leibler divergence," <http://en.wikipedia.org/wiki/Kullback-Leibler_divergence>, 11 pages (accessed Feb. 5, 2015).

Wikipedia, "Mean difference," <http://en.wikipedia.org/wiki/Mean_difference>, 6 pages (accessed Feb. 20, 2015).

* cited by examiner

MULTI-STAGE IMAGE CLASSIFICATION

CROSS REFERENCE TO RELATED APPLICATIONS

This is a continuation of U.S. patent application Ser. No. 14/664,662, filed Mar. 20, 2015, which is hereby incorporated by reference.

BACKGROUND

Computing devices are increasingly being used to send, receive, and process digital media, including digital photos, movies, and video clips. For example, people are increasingly using their devices to share photos and videos on web sites. In addition, people are increasingly mobile and need to access other devices remotely, such as computers at work.

Due to the large amount of digital media content that is being sent, received, and processed by today's computing devices, the efficiency of handling such digital media is becoming increasingly important. For example, selecting an efficient coding technique that is appropriate to the particular content being coded can be important task.

In some situations, it is desirable to determine what types of content, or objects, are present in the digital media. However, classifying the content or objects in the digital media can be extremely challenging due to the wide variation in object appearance, pose, illumination effects, etc. In addition, digital media that involves different types of content, such as computer generated graphics in combination with natural photos or video, can be particularly problematic to classify.

Therefore, there exists ample opportunity for improvement in technologies related to classification of digital media content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for performing multi-stage image classification. For example, multi-stage image classification can comprise a first classification stage and a second classification stage. The first classification stage can determine an overall classification for an input image (e.g., based on relative entropy results calculated for the input image in relation to various classification types). The second classification stage can be performed by dividing the image into a plurality of blocks and classifying individual blocks, or groups of blocks, based on a classification model that is specific to the overall classification of the image determined in the first classification stage.

As another example, a first classification stage can be performed that determines an overall classification for an input image. If the first classification stage result is determined with high confidence, then the image can be encoded using an encoding technique selected based on the overall classification type. Otherwise, the second classification stage can be performed.

As another example, computing devices comprising processing units and memory can be provided for performing operations described herein. For example, a computing device can obtain an input image and classify the input image using the multi-stage image classification techniques described herein. The computing device can encode the image and/or individual blocks of the image using an encoding technique selected based on the classification of the image and/or individual blocks.

As described herein, a variety of other features and advantages can be incorporated into the technologies as desired.

DETAILED DESCRIPTION

Overview

Figure 1:
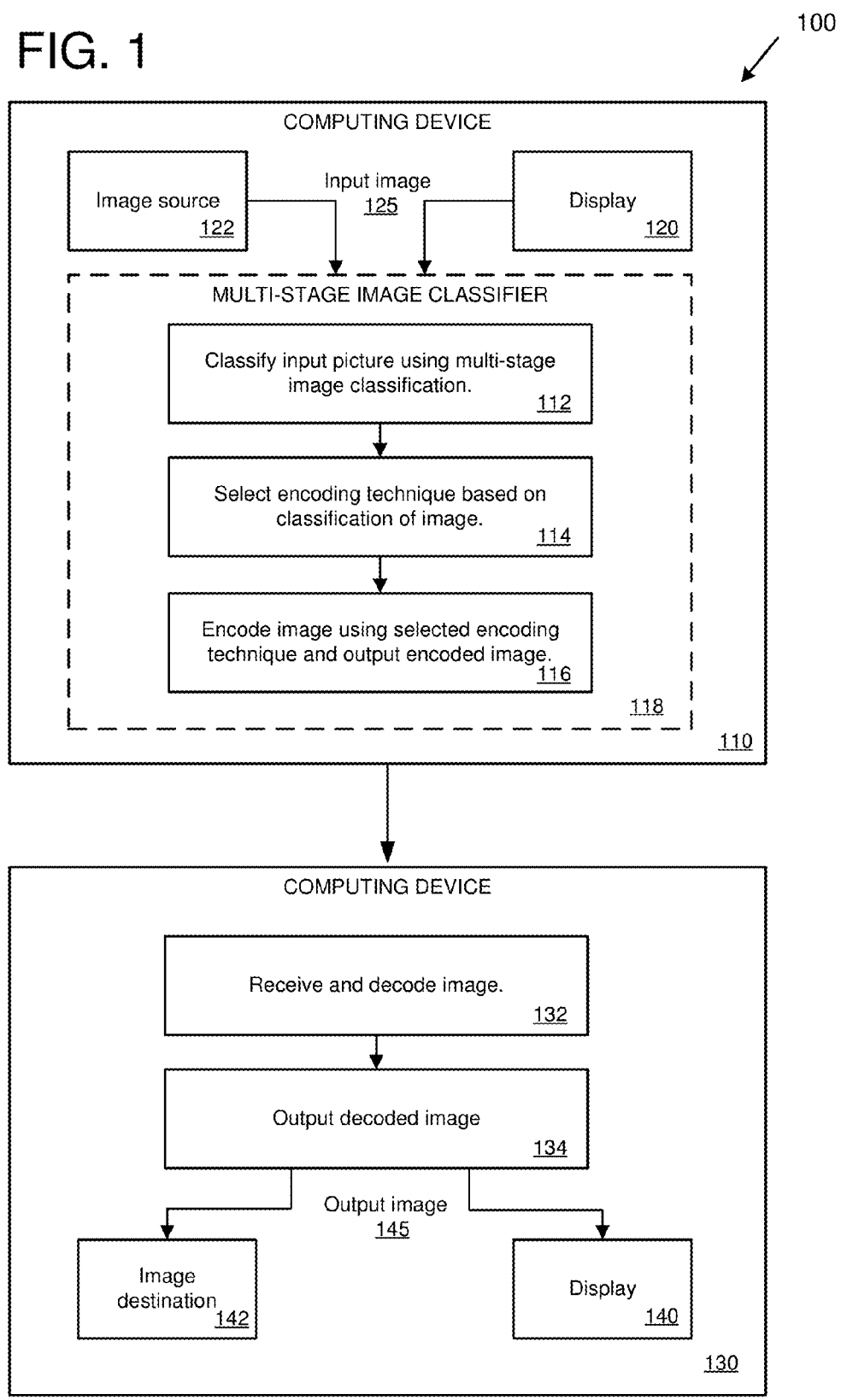
FIG. 1 is a diagram of an example environment implementing multi-stage image classification.

As described herein, various technologies are provided for performing multi-stage image classification. For example, multi-stage image classification can comprise a first classification stage and a second classification stage. The first classification stage can determine an overall classification for an input image (e.g., based on relative entropy results calculated for the input image in relation to various classification types). The second classification stage can be performed by dividing the image into a plurality of blocks and classifying individual blocks, or groups of blocks, based on a classification model that is specific to the overall classification of the image determined in the first classification stage.

Image classification can be used to decide on one or more encoding techniques to use to encode an input image and/or blocks (or groups of blocks) of the input image. For example, a particular image that is classified as containing primarily text content can be encoded using an encoding technique that can efficiently encode text content (e.g., a low-complexity encoding technique such as a run-level based encoding technique that can encode text content efficiently with high quality). As another example, a particular image that is classified as containing primarily video content can be encoded using an encoding technique that can efficiently encode video content (e.g., a video codec, such as H.264). As another example, a particular image that is classified as containing primarily vector graphics content can be encoded using a codec designed to efficiently encode and decode graphics primitives, such as a codec based on the MPEG 3DGC standard. By selecting an encoding technique based on the classification type of the content, the content can be encoded more efficiently. For example, text content can be encoded using a technique that produces high quality while using less computing resources and less storage.

In some implementations, if the overall classification type of the image is determined with high confidence in the first classification stage, the entire image is encoded based on the overall classification type. However, if the confidence level of the overall classification type is not high (e.g., indicating an image with mixture of content types), then the image is divided into blocks which are individually classified in the second classification stage.

Multi-stage classification can provide for more efficient classification of images and/or blocks. For example, classification can be performed for an overall image in a first stage. The classification type from the first classification stage can then be used to select a classification model for use in the second stage that is specific to the classification type (e.g., that was trained with content of the classification type), which can result in more accurate and efficient classification of blocks within the second stage. As another example, if the overall classification of the first stage has high confidence, then the second stage can be skipped and the entire image can be encoded using an encoding technique selected based on the overall classification, which can save computing resources that would otherwise be used for second stage classification.

Images and Classification Types

In the technologies described herein, images and/or blocks of an image are classified using multi-stage classification techniques. An image refers to a digital image that is classified using the multi-stage classification techniques described herein (e.g., that is received as an input image to a multi-stage classifier). Any type of digital image can be classified. For example, the digital image can be a video frame or field, a computer desktop image (e.g., screen content that can include text, graphics, and/or other content displayed by a computing device), a digital photo, etc.

An image can be classified to determine the type of content contained in the image. The type of the image (also called a classification type or image type) can indicate the primary type of content contained in the image. For example, an image containing screen content of a computer desktop may include text content (e.g., a word processing document), graphics content (e.g., icons, windows, etc.), and video content (e.g., a video being played in a web browser). The image can be classified to determine the primary type of content present in the image (e.g., if a majority of the image content is text content, by comparison of content area sizes, then the primary classification can be text).

The multi-stage classification technologies described herein can classify images and/or blocks among a set of possible classification types. The specific classification types used can vary depending on the expected type of content (e.g., the source of the input images) and/or based on other criteria. Below are listed a number of example classification types, which may be used in various combinations and/or along with other classification types.

Text Classification Type.

The text classification type indicates that the image, block, or group of blocks contains primarily text content (e.g., text of a word processing document, text displayed in a user interface, text displayed in a screen content image, etc.).

Video Classification Type.

The video classification type indicates that the image, block, or group of blocks contains primarily video content (e.g., a video frame or field). The video content can be an image (e.g., a frame, field, or picture), of a sequence of images, of a movie or video clip.

Skin Classification Type.

The skin classification type indicates that the image, block, or group of blocks contains primarily solid or gradient content. For example, a screen content image may contain large areas of solid color (e.g., a sold blue background of a computer desktop, a solid gray area of a window header, etc.) and/or areas of gradient content.

Vector Graphics Classification Type.

The vector graphics classification type indicates that the image, block, or group of blocks contains primarily lines, boxes, areas of solid color or gradients, or other types of geometrical primitives. The vector graphics classification type may have some overlap with the skin classification type, and both types can be found in a screen content image.

Picture Classification Type.

The picture classification type indicates that the image, block, or group of blocks contains primarily picture content (e.g., digital photos, computer generated images, etc.). For example, a screen content image may contain digital pictures (e.g., displayed in a photo viewing application or a web browser) and/or other types of computer generated graphics (e.g., icons or other computer generated images).

Texture Classification Type.

The texture classification type indicates that the image, block, or group of blocks contains primarily texture content (e.g., natural and/or artificial texture content). For example, a screen content image may contain areas of texture (e.g., a repeating pattern, such as a checkerboard pattern that may be used as a background of a content area).

Non-Text Classification Type.

The non-text classification type indicates that the image, block, or group of blocks contains primarily non-text content (i.e., content other than text content). For example, non-text content can include video content, skin content, picture content, texture content, and/or other types of non-text content.

Classifying Images

In the technologies described herein, images and/or blocks of an image are classified using multi-stage classification techniques. For example, a multi-stage classifier can classify an input image, block, or group of blocks into one of a plurality of classification types.

In some implementations, multi-stage classification uses two classification stages. In the first classification stage, an input image is classified as a whole to determine an overall classification type for the image. For example, the image may be classified as text, video, texture, etc. In the second classification stage, the image is divided into blocks, and the blocks are classified (e.g., on an individual or group basis) using a classification model that is selected based on the overall classification type from the first classification stage. For example, if the first classification stage results in a text classification type, then a classification model that is specific to the text classification type (e.g., that has been trained to distinguish text content) can be selected and used for the second classification stage.

In some implementations, a first classification stage is performed to determine an overall classification type for an input image. If the first classification stage can determine the overall classification type with a degree of certainty (e.g., with a high probability, which could be evaluated using a threshold value such as 95%), then the classification process can end and the image can be encoded using an encoding technique that is selected based on the overall classification technique (e.g., if the classification type is text, then an encoding technique that efficiently encodes text image content can be used to encode the entire image). On the other hand, if the result of the first classification stage does not meet the desired degree of certainty, then the classification process can proceed to the second stage (e.g., dividing the image into blocks and classifying the individual blocks).

First Classification Stage

In the technologies described herein, a first classification stage can be performed as part of a multi-stage image classification technique. The first classification stage classifies an input image and results in an overall classification type for the image. The overall classification for the image indicates the primary type of content in the image.

In the first classification stage, relative entropy is used to classify the input image. For example, a relative entropy result can be calculated for an input image and used to classify the input image as one of a number of available classification types.

In some implementations, the relative entropy result is calculated using two probability distributions from two features of the input image (e.g., two different histogram features, one histogram feature and one texture feature, etc.) and the resulting relative entropy distribution is evaluated to determine the classification type of the input image. For example, the relative entropy distribution result can be compared to prior training results using rules and/or thresholds to determine which classification type most closely matches the current input image.

In some implementations, the relative entropy is applied to create a measure of the distance of various distributions. The relative entropy, also known as the Kullback-Leibler divergence, between two probability distributions on a random variable is a measure of the distance between them. Formally, given two probability distributions $p(x)$ and $q(x)$ over a discrete random variable X, the relative entropy given by $D(p \| q)$ is defined by Equation 1 below.

$$D(p \| q) = \sum_{x \in X} p(x) \log \frac{p(x)}{q(x)} \quad \text{(Equation 1)}$$

$D(p \| q)$ is a non-negative continuous function and equals to zero if $p(x)$ and $q(x)$ coincide. Thus $D(p \| q)$ can be naturally viewed as a distance between the measures $p(x)$ and $q(x)$. However, $D(p \| q)$ is not a metric because it generally is neither symmetric, nor satisfies the triangle inequality. It is not difficult to see that $D(p \| q)$ can be equal to zero while the conditional entropy rate is large and vice versa. Thus, an information distance based on relative entropy can be used as an optimizer or cluster for feature classification. To accomplish the feature classification through relative entropy techniques the following procedure can to be performed (e.g., as a training process) to determine the grouping (or clustering) of relative entropy results for various classification types:

1. Create a training set of images (e.g., images with classification types of picture, texture, and skin).
2. Calculate the probability distribution of a main feature (e.g., a histogram feature such as a luminance channel histogram feature).
3. Calculate the probability distribution of the second feature (e.g., a texture feature such as a mean average difference feature).
4. Use Equation 1 to calculate the relative entropy for each of the training images.
5. Check characteristics of relative entropy for the desired classification types (e.g., picture, texture, and skin).
6. Determine whether relative entropy can distinguish between the classification types based on the features (e.g., determine if the training images can be clustered or grouped based on the relative entropy results), and if so, establish rules or thresholds for distinguishing among the desired classification types based on the features.

Using the above six-step procedure, rules and/or thresholds can be established for classifying an input image into one of a number of classification types. For example, an input image can be obtained and probability distributions calculated (e.g., one for a histogram feature and one for a texture feature). Equation 1 can then be used to calculate the relative entropy result for the input image based on the distributions. The relative entropy result can then be compared to the prior training results to determine the classification for the input image.

In some implementations, a threshold is used to classify the input image into one of a number of classification types. In a specific implementation, the threshold is set to the maximum value of the relative entropy among the training images (the highest value among the distributions of the training images). In another specific implementation, the threshold is set to the mean average based on integrating the distribution of the training images.

For example, using color or brightness histogram features, relative entropy results from a training set of text images may contain only two or three non-zero values, while relative entropy results from a training set of picture images may contain non-zero values at almost all locations. Therefore, a threshold can be established to distinguish between text images and picture images using relative entropy results (e.g., less than five non-zero values for an input image might be classified as text while five or more non-zero values might be classified as picture).

Second Classification Stage

In the technologies described herein, a second classification stage can be performed as part of a multi-stage image classification technique. The second classification stage divides the image into blocks and classifies the blocks using features of the blocks and using a classification model selected based on the overall classification type of the image from the first classification stage.

In some implementations, the input image is divided into square blocks. The size of the blocks can be 8×8, 16×16, 32×32, 64×64, or another size. In other implementations, the blocks are not square. In some implementations, the block size is fixed. In other implementations, the block size is adaptive and can vary from image to image and/or within an image.

Features are then calculated (e.g., feature extraction is performed) for the blocks (e.g., for each block or for each group of blocks). In some implementations, a plurality of features is calculated for each block of the image. The following describes a number of example features that can be used in the second stage.

Histogram Features.

One or more histogram features can be calculated for the blocks. Histogram features include a red channel histogram, a green channel histogram, a blue channel histogram, a luminance channel histogram, and chroma channel histograms. Histograms calculated based on other color spaces can be used as well.

Texture Features.

One or more texture features can be calculated for the blocks. One example of a texture feature is a mean average difference (MAD) feature (also called "mean difference") that calculates the variance of average values for a block or group of blocks. Another type of texture feature is one generated using a response filter which can be used to distinguish between different texture areas and boundaries.

Color Features.

One or more color features can be calculated for the blocks. For example, the color of image content (e.g., areas of solid color within skin content) can be determined using histograms. As another example, a lookup table can be used based on RGB values. As yet another example, Gaussian models can be used to calculate color features.

In some implementations, at least one histogram feature is calculated (a luminance channel histogram in a specific implementation) along with at least one texture feature (MAD in a specific implementation).

Using the features, the individual blocks and/or groups of blocks are classified using the selected classification model. The classification model comprises a decision tree table and a support vector machine (SVM) kernel.

The decision tree table uses a decision tree approach to classifying the blocks using the features. In general, decision tree learning uses a decision tree to predict the value of a target variable based on a number of inputs.

The support vector machine kernel uses a pattern recognition approach to classify the input images and/or blocks. In some implementations, the support vector machine kernel is used first in the second stage before applying the decision tree table.

Training a Multi-Stage Image Classifier

In the technologies described herein, a training process can be used to train an image classifier to distinguish between different types of image content (e.g., text content, non-text content, video content, texture content, picture content, skin content, etc.).

In some implementations, training of the second stage of the multi-stage image classifier comprises support vector machine training and decision tree training. For example, an input image is received by the training process (e.g., one of a number of input images used in the training set). The image is then divided into blocks and features (e.g., a plurality of features) are calculated for the blocks. The blocks are classified manually (e.g., by a person that manually labels the blocks as being one of a number of classification types, such as text, non-text, video, texture, etc.). The support vector machine is trained to classify the blocks based on the calculated features. The output of the support vector machine training is a support vector machine kernel. The decision tree is also trained to distinguish the blocks based on the calculated features. The result of the decision tree training is a decision tree table.

In some implementations, the second stage training is specific to the image classification type. Specifically, the input images are first classified (in a first classification stage) into one of a number of classification types using relative entropy. Then, for each of the classification types, the second stage performs decision tree training and support vector machine training that is specific for the classification type using images classified as being of that classification type. The result is a number of classification models, where each classification model comprises a decision tree table and support vector machine kernel that is trained to distinguish between types of content in images that primarily contain content of the classification type for which the classification model was trained.

In some implementations, decision tree training involves the calculation of Gini impurity. Gini impurity is calculated using Equation 2 below.

$$I = \Sigma w_i f_i (1 - f_i) \qquad \text{(Equation 2)}$$

In some implementations, support vector machine training is used to classify input images and/or blocks based on features. In some implementations, support vector machine training and classification is performed as an initial step with decision tree training and classification performed as a subsequent step.

In some implementations, a support vector machine approach is also used to prune training results used for classification and regression analysis. In one implementation, a support vector machine training algorithm takes a set of training results from the decision tree training and builds a model that assigns new examples into one category or the other to achieve a non-probabilistic binary linear classifier. The new examples are then mapped into the same space and predicted to belong to a category based on which side of the gap they fall on.

In some implementations, the support vector machine kernel is defined by Equations 3 and 4 below.

$$Kij = k(xi, xj) = \emptyset(xi) * \emptyset(xj) \qquad \text{(Equation 3)}$$

$$\min \Sigma Z_i + 0.5 * \|W\|^2 \; st \; Z_i \geq (1 - y_i W x_i) \qquad \text{(Equation 4)}$$

Environment for Performing Multi-Stage Image Classification

In the technologies described herein, an environment can be provided for performing multi-stage image classification. The environment can comprise various types of computing devices (e.g., phones, tablets, laptops, desktops, and/or other types of computing devices) which can perform various operations to classify images using multi-stage image classification, encode images based on results of multi-stage image classification, decode images that have been encoded based on multi-stage image classification, display the decoded images, etc.

FIG. 1 is a diagram of an example environment 100 implementing multi-stage image classification. In the example environment 100, a first computing device 110 operates a multi-stage image classifier 118 (e.g., software and/or hardware components for performing operations for multi-stage image classification). As depicted, the multi-stage image classifier 118 receives an input image 125. The input image 125 can be an image that is currently being displayed on a display 120 (e.g., as a screen content image). The input image 125 can also be received from another image source 122 (e.g., from a video file or picture file stored on the computing device 110, from an image capture device, from an external source such as a remote server, etc.).

The multi-stage image classifier 118 classifies the input image using one or more of the multi-stage image classification techniques described herein, as depicted at 112. For example, the multi-stage image classifier 118 can classify the input image using a two-stage approach where the first classification stage results in an overall classification type for the image and the second classification stage classifies individual blocks of the image using a classification model specific to the overall classification type. In some implementations, if the overall classification type is determined with high confidence (e.g., a probability over a threshold value), then the second classification stage is skipped.

In other implementations, the multi-stage image classifier 118 classifies the input image using an approach with more than two stages. For example, the multi-stage image classifier 118 can employ a three-stage approach in which the first classification stage results in an overall classification type for the image, the second stage classifies individual blocks of the image using a limited set of classification types (e.g., only text or non-text), and the third stage further refines the classification of the individual blocks within the limited set of classification types (e.g., classifies the text blocks from the second stage as black or white text and classifies the non-text blocks from the second stage as picture or video). Alternatively, the second classification stage may be divided into multiple sub-stages (e.g., a first sub-stage that classifies the individual blocks within the limited set of classification types and a second sub-stage that further refines the classification type from the first sub-stage).

The multi-stage image classifier 118 selects an encoding technique (e.g., from a number of available encoding techniques) based on the classification of the image, as depicted at 114. For example, an encoding technique can be selected for blocks of the image based on their classification types. The encoding technique can be selected on an individual block basis (e.g., each individual block can be encoding with an encoding technique that is specific to the classification type for that block). The encoding technique can also be selected on the basis of a group of blocks (e.g., groups of blocks with the same classification type can be grouped together for encoding). In some implementations, the entire image is encoded using an encoding technique selected based on the classification type of the overall image (e.g., when the overall image classification from the first classification stage is determined with high confidence).

The multi-stage image classifier 118 encodes the image (the overall image, or blocks or groups of blocks) using the selected encoding technique (or selected encoding techniques) and outputs the encoded image, as depicted at 116. While the operations depicted at 114 and 116 are depicted as being performed by the multi-stage image classifier 118, they can also be performed by other components of the computing device 110 (e.g., by other encoding or media processing components of the computing device 110 that are separate from the multi-stage image classifier 118).

The encoded image can be output by the multi-stage image classifier 118. For example, the encoded image can be saved to a file or transmitted to another device. The example environment 100 depicts a second computing device 130 that can receive the encoded image output by the multi-stage image classifier 118 of the first computing device 110. As depicted at 132, the second computing device 130 receives and decodes the encoded image received from the first computing device 110 (e.g., receive via a network, such as a local area network and/or the Internet). For example, the second computing device 130 can receive the image as an overall image encoded with a specific encoding technique or receive blocks of the image that may be encoded with a variety of different encoding techniques (e.g., a block or blocks with primarily text content encoded with a first encoding technique, a block or blocks with primarily video content encoded with a second encoding technique, and so on). As depicted at 134, the second computing device 130 outputs the decoded output image 145. For example, the decoded output image 145 can be sent to an image destination 142 (e.g., saved to a file, transmitted to yet another computing device, or provided to another destination) or provided for display 140.

In one example scenario, the first computing device 110 and the second computing device 130 implement a remote desktop solution. In the example scenario, the multi-stage image classifier 118 receives an input image 125 representing screen content currently being displayed by the display 120 of the first computing device 110. The multi-stage image classifier 118 classifies and encodes the image (as depicted at 112, 114, and 116) and sends it to the second computing device 130. The second computing device 130 receives and decodes the encoded image, as depicted at 132. The second computing device 130 outputs the decoded image 145 for display 140 by the second computing device 130, as depicted at 134. In this way, a sequence of images of the desktop content (e.g., with a number of images being encoded and transmitted each second) of the first computing device 110 can be classified, encoded, and transmitted to the second computing device 130 for remote display.

Multi-Stage Image Classifier

In the technologies described herein, a multi-stage image classifier can be provided for classifying images. The multi-stage image classifier can determine an overall classification type for an input image using a first classification stage and then perform second stage classification based on the overall classification type from the first stage (e.g., using a classification model specific to the first stage classification type).

Figure 2:
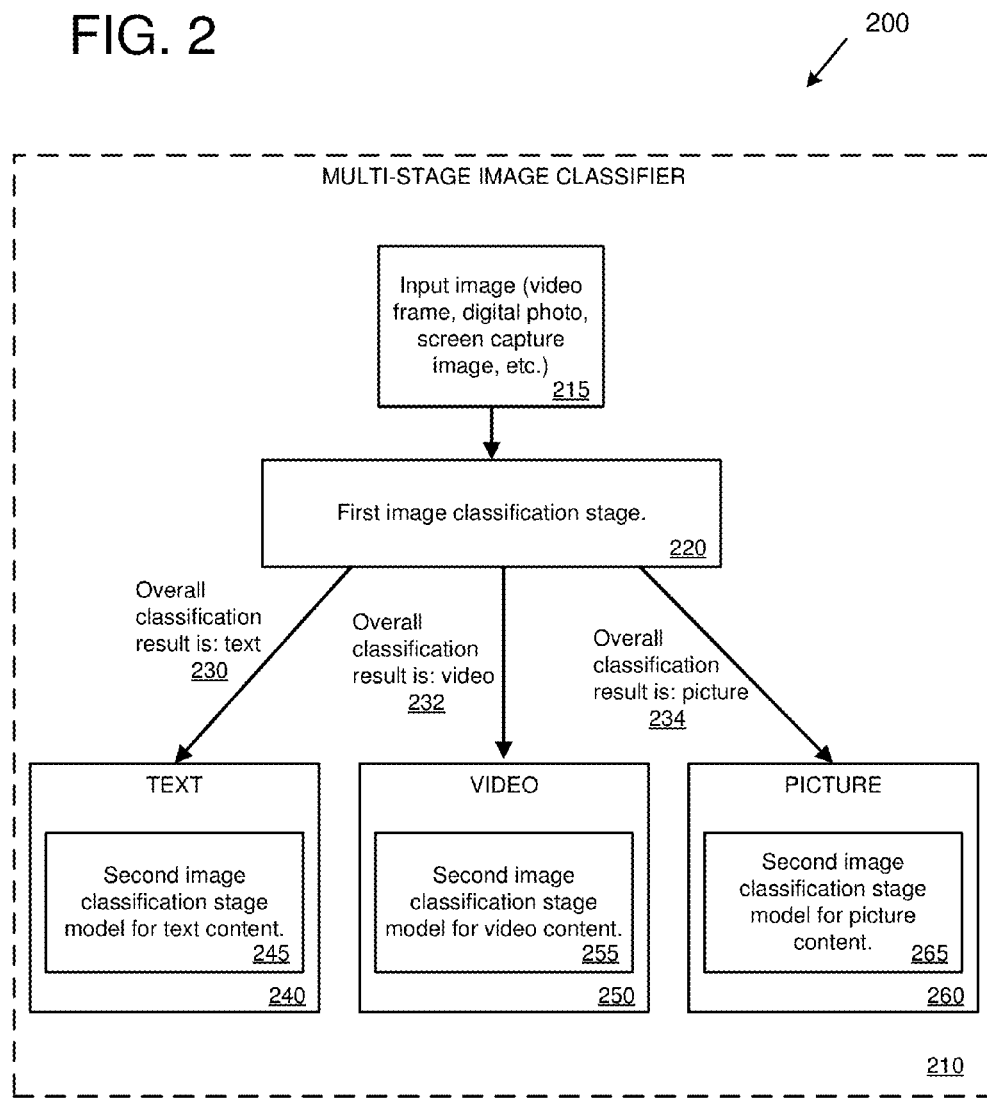
FIG. 2 is a diagram depicting an example multi-stage image classifier with a first classification stage and a second classification stage.

FIG. 2 is a diagram of an example multi-stage image classifier 210 with a first classification stage and a second classification stage. The multi-stage image classifier 210 receives an input image 215. The multi-stage image classifier 210 performs a first image classification stage 220 to determine an overall classification type for the input image 215. In the first image classification stage 220, one or more relative entropy values are calculated for the input image 215 (e.g., one relative entropy value in relation to each of a plurality of classification types). In some implementations, if the overall classification type for the input image 215 is determined with high confidence, the multi-stage image classifier 210 selects an encoding technique for encoding the entire input image and does not perform the second classification stage.

The multi-stage image classifier 210 performs a second image classification stage based on the overall classification type from the first image classification stage 220. Specifically, the multi-stage image classifier 210 selects a classification model depending on the classification type from the first image classification stage 220. For example, if the overall classification type indicates primarily text content (as depicted at 230), then the second image classification stage is performed for the image (as depicted at 240) using a classification model specific for text content 245. If the overall classification type indicates primarily video content (as depicted at 232), then the second image classification stage is performed for video content (as depicted at 250) using a classification model specific for video content 255. If the overall classification type indicates primarily picture content (as depicted at 234), then the second image classification stage is performed for picture content (as depicted at 260) using a classification model specific for picture content 265. It should be understood that the specific classification types (text, video, and picture) are examples, and that additional or/or other classification types can be used in the second image classification stage.

In the second image classification stage (as depicted at 240, 250, and 260), the input image is divided into blocks and the blocks are classified using the classification model selected based on the overall classification from the first image classification stage 220. In some implementations, the classification model comprises a decision tree table and a support vector machine kernel that is specific to the overall classification type (e.g., that was trained to distinguish between images that primarily contained content of the overall classification type). In some implementations, the individual blocks are classified in the second stage by calculating features for the blocks (e.g., performing feature extraction for each of a plurality of features on an individual block basis or a group of blocks basis) and then classifying the individual blocks based on the features and using the classification model. In some implementations, the individual blocks are classified using the same set of classification types available for classifying the overall image (e.g., a text classification type, a video classification type, a picture classification type, etc.).

Figure 3:
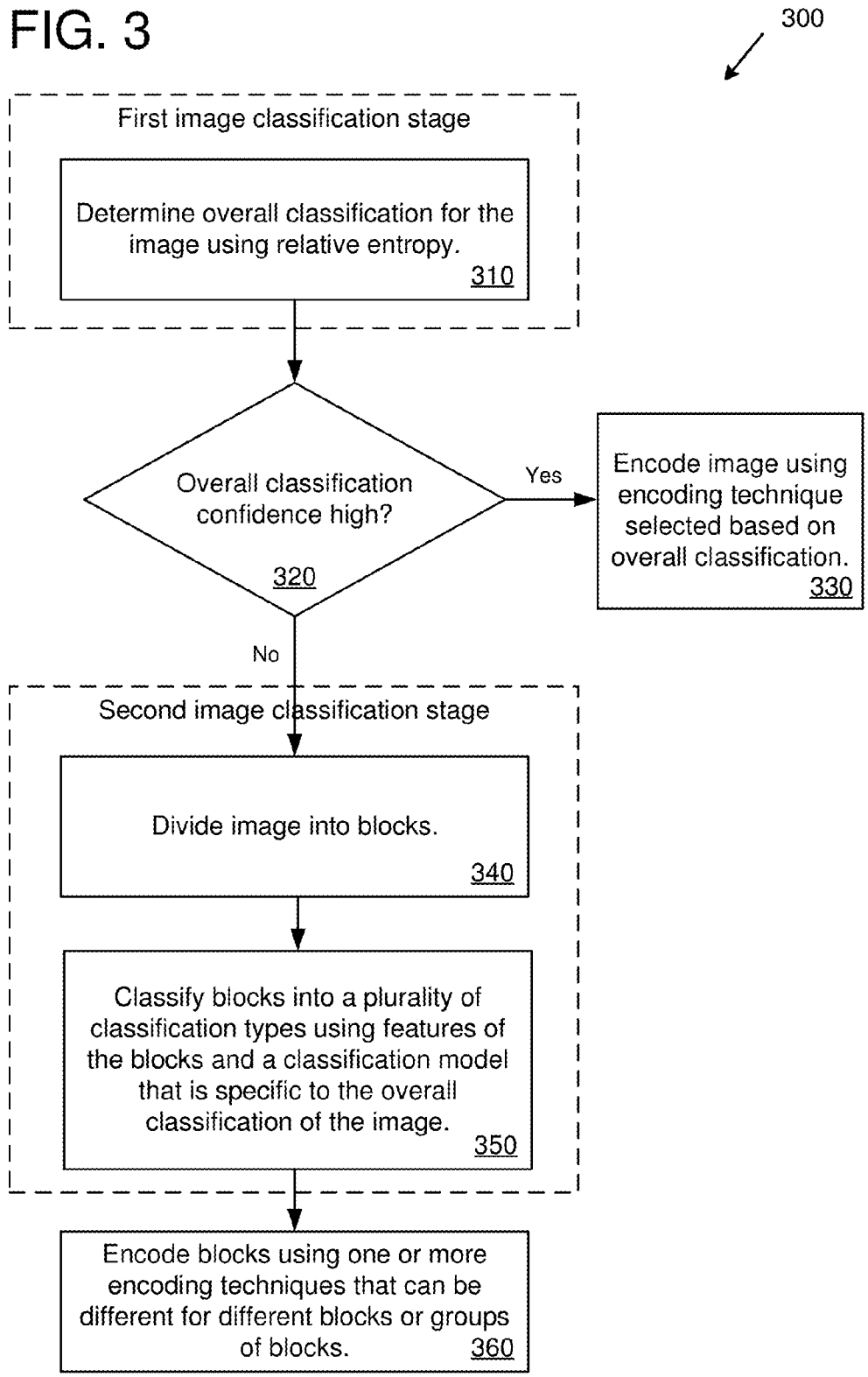
FIG. 3 is a flowchart of an example method for classifying images using multi-stage image classification, including a first classification stage and a second classification stage.

FIG. 3 is a flowchart of an example method 300 for classifying images using multi-stage image classification, including a first classification stage and a second classification stage. At 310, a first classification stage is performed to determine an overall classification for an image. The overall classification for the image is determined by classifying the image into one of a plurality of classification types using relative entropy. For example, a relative entropy result can be calculated to determine which classification type, of the plurality of possible classification types, is the best match for the image.

At 320, the confidence in the overall classification determined at 310 is evaluated. If the confidence is high (e.g., if the confidence in the overall classification type is over a specific confidence threshold, such as 95%), then the method proceeds to 330 where the image is encoded, as a whole, using an encoding technique selected based on the overall classification. If the confidence in the overall classification type is not high, then the method proceeds to the second image classification stage.

The second image classification stage beings at 340 where the image is divided into blocks. For example, the blocks can be 8×8 blocks, 16×16 blocks, 32×32 blocks, or blocks of another size (e.g., square blocks or non-square blocks). Next, at 350, the blocks are classified into a plurality of classification types using features of the blocks and a classification model that is specific to the overall classification of the image. For example, one or more features (e.g., histogram features, texture features, and/or other types of features) can be calculated for each block or each group of blocks and the block, or group of blocks, can be classified based on the calculated features and the classification model.

At 360, the blocks are encoded using one or more encoding techniques that can be different for different blocks or groups of blocks. For example, those blocks that are classified as primarily text content blocks can be encoded using a first encoding technique while those blocks that are classified as primarily non-text content blocks can be encoded using a second encoding technique that is different from the first encoding technique.

Methods for Multi-Stage Image Classification

In any of the examples herein, methods can be provided for performing multi-stage image classification. For example, an input image can be classified using a multi-stage image classifier that performs a first classification stage to classify the overall image and a second classification stage to classify individual blocks of the image using a classification model specific to the overall classification type of the image determined by the first stage.

Figure 4:
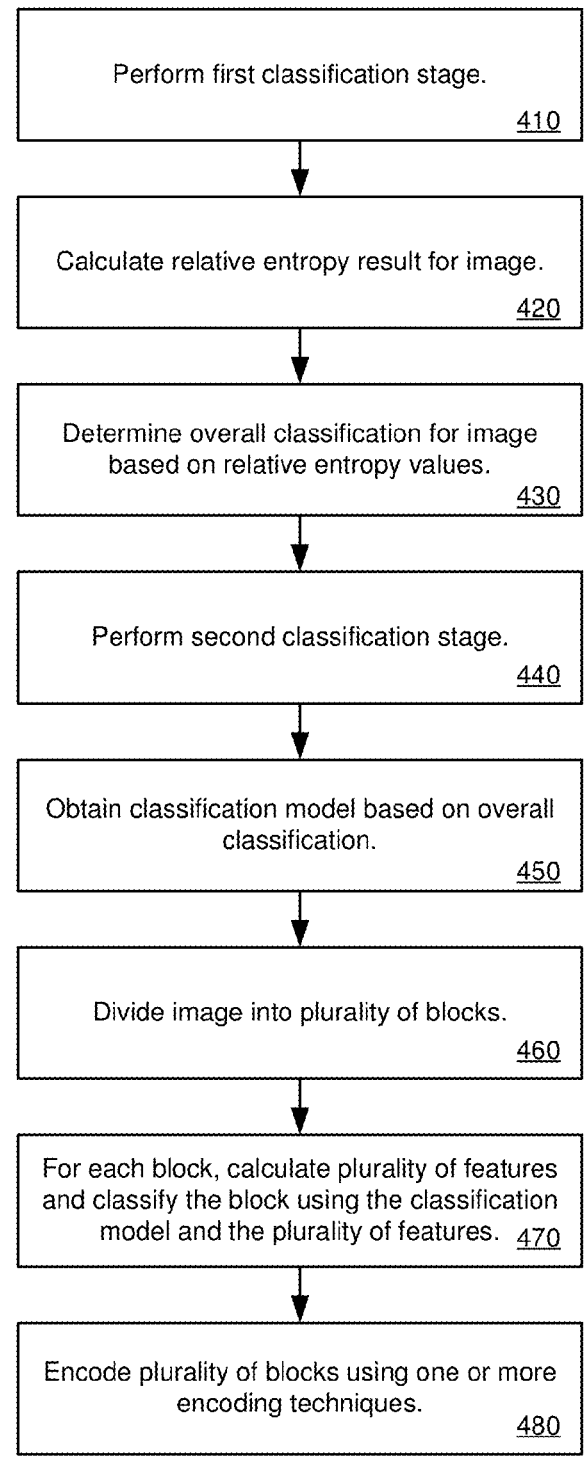
FIG. 4 is a flowchart of an example method for multi-stage image classification.

FIG. 4 is a flowchart of an example method 400 for multi-stage image classification. The example method 400 can be performed, at least in part, by a computing device, such as the computing device 110 described with reference to FIG. 1.

At 410, a first classification stage is performed. In the first classification stage, an input image can be obtained (e.g., received as a screen content image of a computer desktop, received as a video frame or field, or received from another image source). The first classification stage comprises calculating a relative entropy result for the image, as depicted at 420. Based on the relative entropy result, an overall classification for the image is determined, as depicted at 430. For example, the overall image is classified into one of a plurality of classification based on which classification type most closely matches the content of the image using the relative entropy result. For example, the overall classification could be a text classification type indicating that the image contains primarily text content or a video classification type indicating that the image contains primarily video content.

At 440, a second classification stage is performed. In the second classification stage, a classification model is obtained based on the overall classification of the image from the first classification stage, as depicted at 450. The classification model can comprise a support vector machine kernel and a decision tree table. For example, if the overall classification type of the image is text, then a classification model can be obtained that was trained to distinguish between various types of content within images containing primarily text content.

At 460, the image is divided into a plurality of blocks. The blocks can be blocks of a fixed size (e.g., 32×32 blocks or 16×16 blocks) or blocks of an adaptive size (e.g., with block sizes that vary for different regions of content within the image).

At 470, a plurality of features are calculated for each block, of the plurality of blocks, and the block is classified using the classification model and the plurality of features. The plurality of features can include histogram features, texture features, and/or other features. In some implementations, at least one histogram feature and at least one texture feature is calculated for each block. In some implementations, the same classification types are used in both the first stage and the second stage (e.g., the overall image may be classified as one of text, video, and picture, and the individual blocks would then be classified as one of text, video, and picture). Individual blocks in the second stage can have a variety of classification types, which may or may not be the same as the overall classification type for the image. For example, an image that contains primarily text content would likely contain blocks classified as text but may also have some blocks classified as video or picture (e.g., the image may depict a text document with an embedded picture or video).

At 480, the plurality of blocks are encoded using one or more encoding techniques that are selected based on the classification types of the plurality of blocks. In some implementations, the encoding technique used can be selected on a block-by-block basis. For example, a first block with a text classification type can be encoded using a first encoding technique while a second block with a video classification type can be encoded using a second encoding technique.

Figure 5:
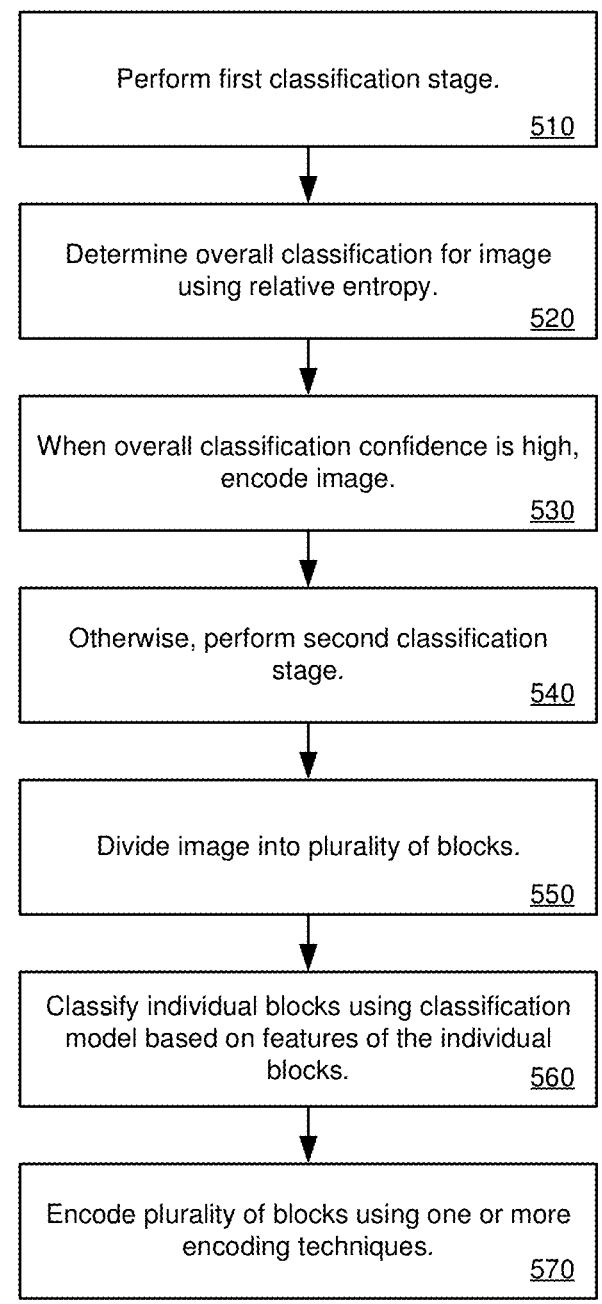
FIG. 5 is a flowchart of an example method for multi-stage image classification.

FIG. 5 is a flowchart of an example method 500 for multi-stage image classification. The example method 500 can be performed, at least in part, by a computing device, such as the computing device 110 described with reference to FIG. 1.

At 510, a first classification stage is performed. In the first classification stage, an input image is obtained (e.g., received as a screen content image of a computer desktop, received as a video frame or field, or received from another image source). The first classification stage comprises determining an overall classification for the image using relative entropy, as depicted at 520. In classifying the overall image, the image is classified as one of a plurality of possible classification types. When the overall classification confidence is high, as depicted at 530, the image is encoded using an encoding technique based on the overall classification of the image and the second stage is skipped.

At 540, when the overall classification confidence is not high, a second classification stage is performed. In the second stage, the image is divided into a plurality of blocks, as depicted at 550. The blocks can be blocks of a fixed size (e.g., 32×32 blocks or 16×16 blocks) or blocks of an adaptive size (e.g., with block sizes that vary for different regions of content within the image). Individual blocks are then classified using a classification model specific to the overall classification of the image and based on a plurality of features of the individual blocks, as depicted at 560.

At 570, the plurality of blocks are encoded using one or more encoding techniques that are selected based on the classification types of the individual blocks.

Computing Systems

Figure 6:
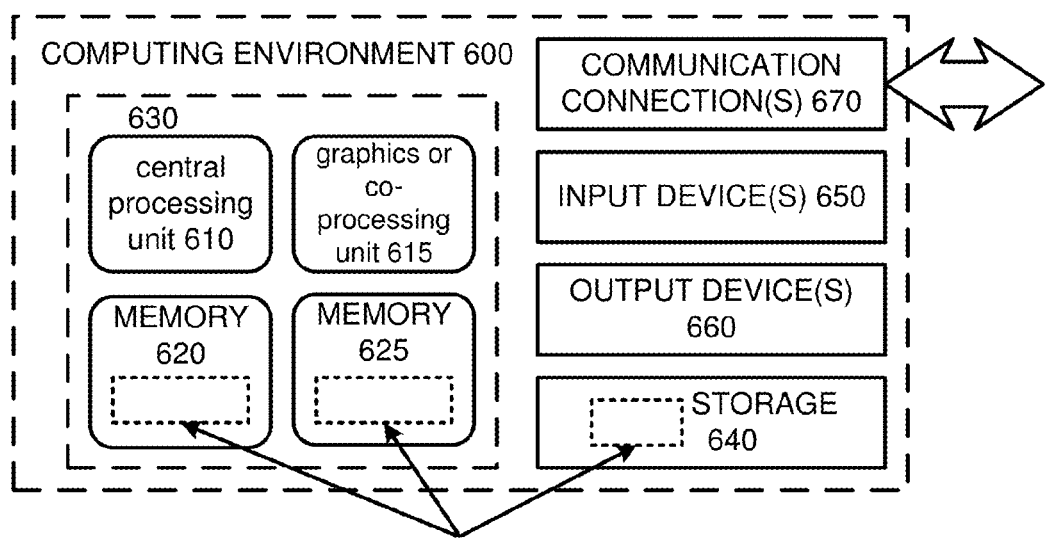
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
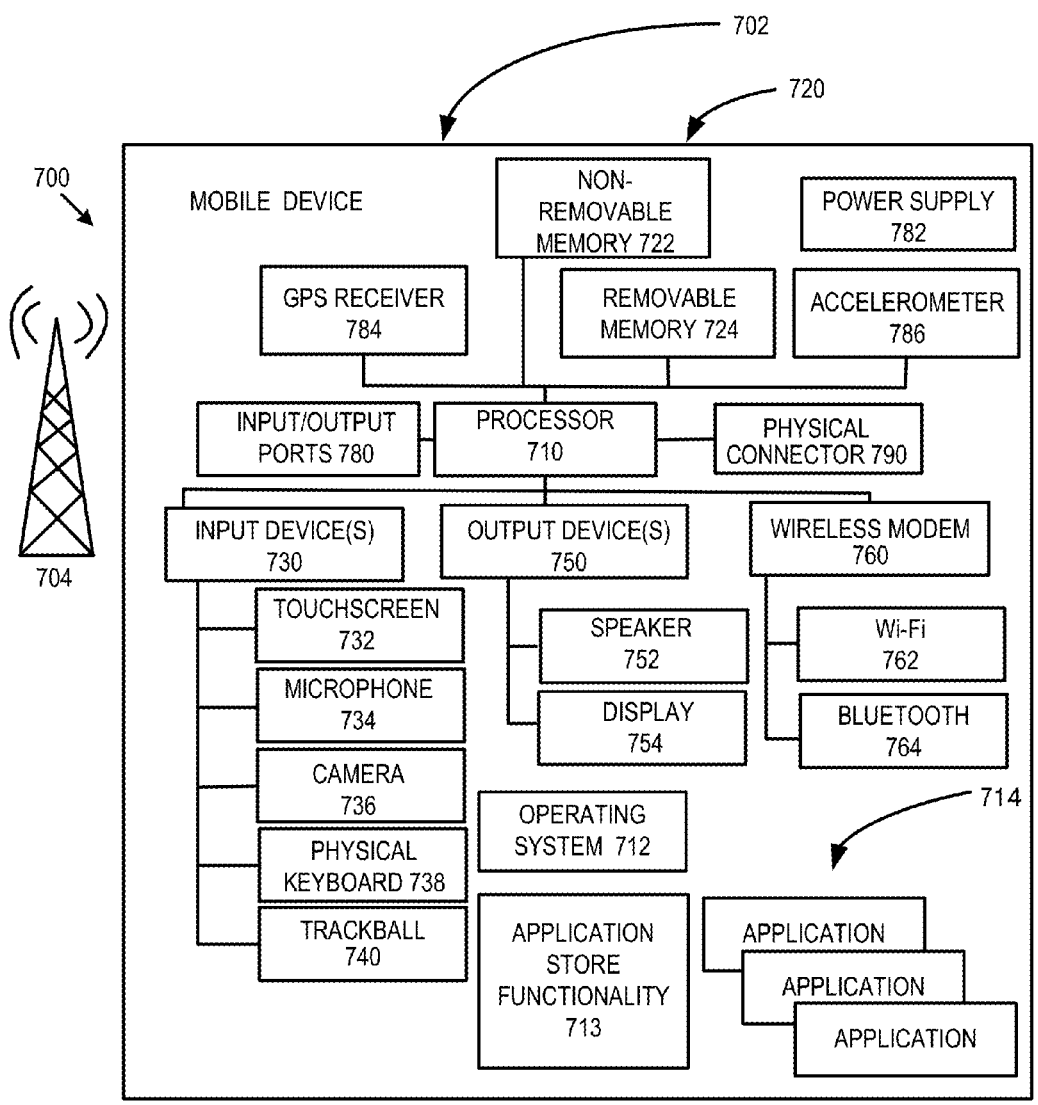
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Cloud-Supported Environment

Figure 8:
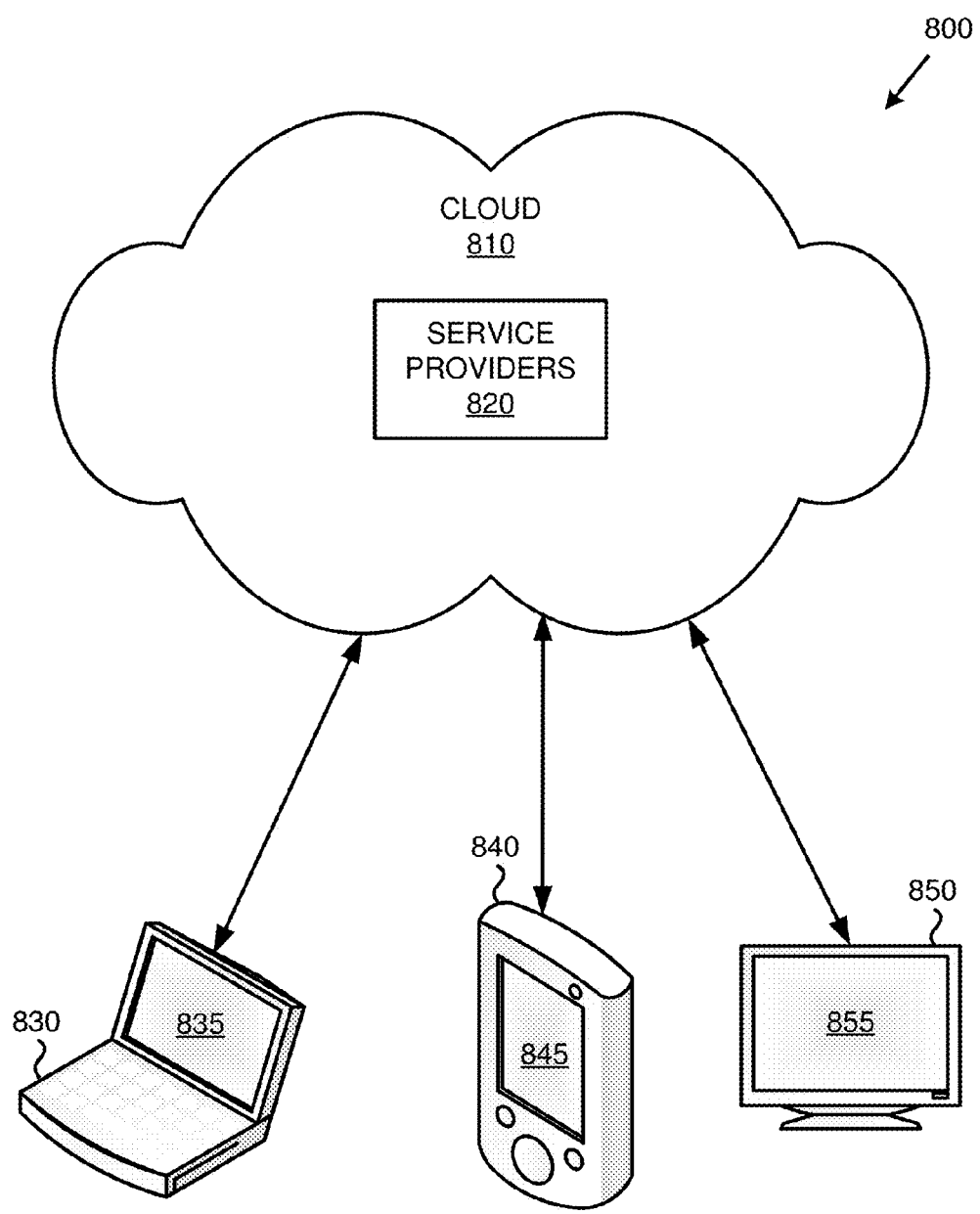
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections (e.g., 670, 760, 762, and 764).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the computing device configured to perform operations for multi-stage image classification, the operations comprising:
performing a first classification stage, comprising:
calculating, for an image, a relative entropy result for the image; and
determining an overall classification for the image based on the relative entropy result, wherein the overall classification is one of a plurality of classification types;
performing a second classification stage, comprising:
obtaining a classification model based on the overall classification for the image;
dividing the image into a plurality of blocks; and
for each block of the plurality of blocks:
calculating a plurality of features for the block, comprising calculating at least one histogram feature for the block, and calculating at least one texture feature for the block, wherein the at least one texture feature comprises a mean average difference feature, and wherein the at least one histogram feature is at least one of:
a red channel histogram feature;
a green channel histogram feature;
a blue channel histogram feature;
a luminance channel histogram feature; and
one or more chroma channel histogram features; and
classifying the block using the classification model and the plurality of features, wherein the block is classified into one of the plurality of classification types; and
encoding the plurality of blocks using one or more encoding techniques, wherein the one or more encoding techniques are selected based on the classification types of the plurality of blocks.

2. The computing device of claim 1 wherein the plurality of classification types comprises:
a text classification type indicating that the image or block contains primarily text content; and
a non-text classification type indicating that the image or block contains primarily non-text content;
wherein at least one block, of the plurality of blocks, is classified as a classification type different from the overall classification for the image.

3. The computing device of claim 1 wherein calculating the relative entropy result for the image comprises:
determining a first distribution for the image for a first feature;
determining a second distribution for the image for a second feature; and
calculating the relative entropy result using the first distribution and the second distribution;
wherein the overall classification for the image is determined by comparing the relative entropy result to one or more threshold values.

4. The computing device of claim 1 wherein the classification model comprises:
a decision tree that is specific to the overall classification for the image; and
a support vector machine kernel that is specific to the overall classification for the image.

5. The computing device of claim 1 wherein encoding the plurality of blocks using the one or more encoding techniques comprises:
encoding a first number of blocks, of the plurality of blocks, that are classified as a first classification type, of the plurality of classification types, using a first encoding technique of the one or more encoding techniques; and
encoding a second number of blocks, of the plurality of blocks, that are classified as a second classification type, of the plurality of classification types, using a second encoding technique of the one or more encoding techniques.

6. The computing device of claim 1 wherein encoding the plurality of blocks using the one or more encoding techniques comprises:
encoding a first number of blocks, of the plurality of blocks, that are classified as primarily text content blocks using a low-complexity encoding technique; and
encoding a second number of blocks, of the plurality of blocks, that are classified as primarily video content blocks using a video codec.

7. The computing device of claim 1 wherein the second classification stage is performed upon determining that probability of the overall classification of the image from the first classification stage is less than a confidence threshold.

8. The computing device of claim 1 wherein the plurality of classification types are two or more of the following:
a text classification type indicating that the image or block contains primarily text content;
a non-text classification type indicating that the image or block contains primarily non-text content;
a video classification type indicating that the image or block content contains primarily video content;
a picture classification type indicating that the image or block content contains primarily picture content;
a texture classification type indicating that the image or block content contains primarily texture content; and
a skin classification type indicating that the image or block content contains primarily skin content.

9. A method for multi-stage image classification, the method comprising:
performing a first classification stage, comprising:
receiving a digital image;
calculating a relative entropy result for the image; and
determining an overall classification for the image based on the relative entropy result, wherein the overall classification is one of a plurality of classification types;
performing a second classification stage, comprising:
obtaining a classification model based on the overall classification for the image;
dividing the image into a plurality of blocks; and
for each block of the plurality of blocks:
calculating a plurality of features for the block, comprising calculating at least one histogram feature for the block, and calculating at least one texture feature for the block, wherein the at least one texture feature comprises a mean average difference feature, and wherein the at least one histogram feature is at least one of:
a red channel histogram feature;
a green channel histogram feature;
a blue channel histogram feature;
a luminance channel histogram feature; and
one or more chroma channel histogram features; and
classifying the block using the classification model and the plurality of features, wherein the block is classified into one of the plurality of classification types; and
encoding the plurality of blocks using one or more encoding techniques that are selectable on a block-by-block basis, wherein the one or more encoding techniques are selected based on the classification types of the plurality of blocks.

10. The method of claim 9 wherein the plurality of classification types are two or more of the following:
a text classification type indicating that the image or block contains primarily text content;
a non-text classification type indicating that the image or block contains primarily non-text content;
a video classification type indicating that the image or block content contains primarily video content;
a picture classification type indicating that the image or block content contains primarily picture content;
a texture classification type indicating that the image or block content contains primarily texture content; and a skin classification type indicating that the image or block content contains primarily skin content.

11. The method of claim 9 wherein calculating the relative entropy result for the image comprises:
determining a first distribution for the image for a first feature;
determining a second distribution for the image for a second feature; and
calculating the relative entropy result using the first distribution and the second distribution;
wherein the overall classification for the image is determined by comparing the relative entropy result to one or more threshold values.

12. The method of claim 9 wherein the classification model comprises:
a decision tree that is specific to the overall classification for the image; and
a support vector machine kernel that is specific to the overall classification for the image.

13. The method of claim 9 wherein the second classification stage is performed upon determining that probability of the overall classification of the image from the first classification stage is less than a confidence threshold.

14. The method of claim 9 wherein the plurality of classification types comprises:
a text classification type indicating that the image or block contains primarily text content; and
a non-text classification type indicating that the image or block contains primarily non-text content;
wherein at least one block, of the plurality of blocks, is classified as a classification type different from the overall classification for the image.

15. The method of claim 9 wherein the second classification stage is performed upon determining that probability of the overall classification of the image from the first classification stage is less than a confidence threshold.

16. A computer-readable storage medium storing computer-executable instructions for causing a computing device to perform a method for multi-stage image classification, the method comprising:
performing a first classification stage, comprising:
determining an overall classification for an image by classifying the image into one of a plurality of classification types using relative entropy;
when the overall classification confidence is high, encoding the image using an encoding technique selected based on the classification type for the image; and
otherwise, performing a second classification stage, comprising:
dividing the image into a plurality of blocks;
classifying individual blocks, of the plurality of blocks, among the plurality of classification types using a classification model specific to the overall classification of the image and based on a plurality of features of the individual blocks, comprising, for each of the individual blocks, calculating at least one histogram feature for the block, and calculating at least one texture feature for the block, wherein the at least one texture feature comprises a mean average difference feature, and wherein the at least one histogram feature is at least one of:
a red channel histogram feature;
a green channel histogram feature;
a blue channel histogram feature;
a luminance channel histogram feature; and
one or more chroma channel histogram features; and
encoding the plurality of blocks using one or more encoding techniques, wherein the one or more encoding techniques are selected based on the classification types of the individual blocks.

17. The computer-readable storage medium of claim 16 wherein determining the overall classification for the image comprises:
calculating a relative entropy result for the image; and
comparing the relative entropy result to one or more threshold values.

18. The computer-readable storage medium of claim 16 wherein the classification model comprises:
a decision tree that is specific to the overall classification for the image; and
a support vector machine kernel that is specific to the overall classification for the image.

19. The computer-readable storage medium of claim 16 wherein the plurality of classification types comprises:
a text classification type indicating that the image or block contains primarily text content; and
a non-text classification type indicating that the image or block contains primarily non-text content;
wherein at least one block, of the plurality of blocks, is classified as a classification type different from the overall classification for the image.

20. The computer-readable storage medium of claim 16 wherein the plurality of classification types are two or more of the following:
a text classification type indicating that the image or block contains primarily text content;
a non-text classification type indicating that the image or block contains primarily non-text content;
a video classification type indicating that the image or block content contains primarily video content;
a picture classification type indicating that the image or block content contains primarily picture content;
a texture classification type indicating that the image or block content contains primarily texture content; and
a skin classification type indicating that the image or block content contains primarily skin content.

* * * * *